(12) United States Patent
Low

(10) Patent No.: US 8,999,190 B2
(45) Date of Patent: *Apr. 7, 2015

(54) HEAT TRANSFER COMPOSITIONS

(71) Applicant: Mexichem Amanco Holdings S.A. de C.V., Tlalnepantla (MX)

(72) Inventor: Robert E Low, Cheshire (GB)

(73) Assignee: Mexichem Amanco Holding S.A. de C.V., Tlalnepantla (MX)

( * ) Notice: Subject to any disclaimer, the term of this patent is extended or adjusted under 35 U.S.C. 154(b) by 0 days.

This patent is subject to a terminal disclaimer.

(21) Appl. No.: 13/717,846

(22) Filed: Dec. 18, 2012

(65) Prior Publication Data

US 2013/0140482 A1 Jun. 6, 2013

Related U.S. Application Data

(63) Continuation of application No. 13/028,494, filed on Feb. 16, 2011, now Pat. No. 8,333,901.

(30) Foreign Application Priority Data

Feb. 16, 2010 (GB) .................................. 1002619.3

(51) Int. Cl.
C09K 5/04 (2006.01)
F25D 11/00 (2006.01)
F25D 13/00 (2006.01)
B01F 1/00 (2006.01)
G06Q 99/00 (2006.01)

(52) U.S. Cl.
CPC .............. C09K 5/044 (2013.01); G06Q 99/00 (2013.01)

(58) Field of Classification Search
CPC ............ C09K 5/045; C09K 5/044; F25B 1/00
USPC ......... 252/67, 68, 69, 364; 62/56, 304, 324.1, 62/467; 264/416; 510/410, 412; 134/34
See application file for complete search history.

(56) References Cited

U.S. PATENT DOCUMENTS

| | | | |
|---|---|---|---|
| 3,723,318 A | 3/1973 | Butler | |
| 3,884,828 A | 5/1975 | Butler | |
| 5,053,155 A | 10/1991 | Mahler | |
| 5,616,275 A | 4/1997 | Chisolm et al. | |
| 5,714,083 A | 2/1998 | Turner | |
| 5,788,886 A | 8/1998 | Minor et al. | |
| 6,258,292 B1 | 7/2001 | Turner | |
| 6,374,629 B1 | 4/2002 | Oberle et al. | |
| 6,426,019 B1 | 7/2002 | Acharya et al. | |
| 6,881,354 B2 | 4/2005 | Arman et al. | |
| 7,238,299 B2 | 7/2007 | Pham et al. | |
| 7,569,170 B2 | 8/2009 | Minor | |
| 7,629,306 B2 | 12/2009 | Singh et al. | |
| 7,807,074 B2 | 10/2010 | Luly et al. | |
| 7,829,748 B1 | 11/2010 | Tung et al. | |
| 7,846,355 B2 | 12/2010 | Schweitzer et al. | |
| 7,862,740 B2 | 1/2011 | Minor et al. | |
| 7,862,741 B2 | 1/2011 | Minor et al. | |
| 7,862,742 B2 | 1/2011 | Minor et al. | |
| 7,879,253 B2 | 2/2011 | Minor et al. | |
| 7,906,037 B2 | 3/2011 | Minor et al. | |
| 7,914,696 B2 | 3/2011 | Low et al. | |
| 7,959,825 B2 | 6/2011 | Minor et al. | |
| 8,333,901 B2 * | 12/2012 | Low | ............................ 252/67 |
| 8,512,591 B2 | 8/2013 | Low | |
| 8,628,681 B2 | 1/2014 | Low | |
| 2002/0046568 A1 | 4/2002 | Thomas | |
| 2003/0042463 A1 | 3/2003 | Arman et al. | |
| 2004/0119047 A1 | 6/2004 | Singh et al. | |
| 2004/0127383 A1 | 7/2004 | Pham et al. | |
| 2004/0256594 A1 | 12/2004 | Singh et al. | |
| 2005/0233923 A1 | 10/2005 | Singh et al. | |
| 2005/0233932 A1 | 10/2005 | Singh et al. | |
| 2005/0245421 A1 | 11/2005 | Singh et al. | |
| 2005/0247905 A1 | 11/2005 | Singh | |
| 2006/0043331 A1 | 3/2006 | Shankland | |
| 2006/0243944 A1 | 11/2006 | Minor et al. | |
| 2006/0243945 A1 | 11/2006 | Minor et al. | |
| 2007/0007488 A1 | 1/2007 | Singh et al. | |
| 2007/0010592 A1 | 1/2007 | Bowman et al. | |
| 2007/0069175 A1 | 3/2007 | Thomas et al. | |
| 2007/0108403 A1 | 5/2007 | Sievert et al. | |
| 2007/0210275 A1 | 9/2007 | Luly et al. | |
| 2007/0210276 A1 | 9/2007 | Luly et al. | |
| 2008/0069177 A1 | 3/2008 | Minor | |
| 2008/0099190 A1 | 5/2008 | Singh et al. | |
| 2008/0121837 A1 | 5/2008 | Singh et al. | |
| 2008/0171652 A1 | 7/2008 | Singh et al. | |

(Continued)

FOREIGN PATENT DOCUMENTS

| | | |
|---|---|---|
| CA | 668494 | 8/1963 |
| CN | 95117074.0 | 6/1998 |

(Continued)

OTHER PUBLICATIONS

Althouse, A.D. et al. Modern Refrigeration and Air Conditioning, 1988, chapters 26 and 27.
Ashrae Standard 34, 2004.
Downing R.C., Fluorocarbon Refrigerants Handbook, 1988, Prentice-Hall, pp. 21-22, pp. 134 and 139, pp. 371-372.
Kleiber, Vapor-liquid equilibria of binary refrigerant mixtures containing propylene or R134a, Fluid Phase Equilib., 1994, pp. 149-194.
Lee et al., Phase Equilibria of Chlorofluorocarbon Alternative Refrigerant Mixtures, J. Chem. Eng. Data, 1999, pp. 190-192.
Ho et al., Measurement of Vapor-Liquid Equilibria for the Binary Mixture Difluoromethane (HFC-32)+Propylene (r-1270), J. Chem, Eng. Data, 2005, pp. 419-424.
Nagel, M. et al., Vapour-liquid equilibrium of ternary mixtures of the refrigerants R32, R1125, and R134a, Int. J. Refrig., 1995, pp. 534-543.

(Continued)

*Primary Examiner* — Douglas McGinty
(74) *Attorney, Agent, or Firm* — Ryan Kromholz & Manion, S.C.

(57) ABSTRACT

The invention provides a heat transfer composition comprising R-1234ze (E), R-32 and 1,1,1,2-tetrafluoroethane (R-134a).

51 Claims, 6 Drawing Sheets

(56) References Cited

U.S. PATENT DOCUMENTS

| | | |
|---|---|---|
| 2008/0230738 A1 | 9/2008 | Minor |
| 2008/0308763 A1 | 12/2008 | Singh |
| 2008/0314073 A1 | 12/2008 | Minor |
| 2009/0120619 A1 | 5/2009 | Sievert et al. |
| 2009/0249809 A1 | 10/2009 | Minor et al. |
| 2009/0250650 A1 | 10/2009 | Minor et al. |
| 2009/0253820 A1 | 10/2009 | Bowman et al. |
| 2009/0255285 A1 | 10/2009 | Minor et al. |
| 2009/0272931 A1 | 11/2009 | Minor et al. |
| 2009/0277194 A1 | 11/2009 | Minor et al. |
| 2009/0278072 A1 | 11/2009 | Minor et al. |
| 2009/0278076 A1 | 11/2009 | Singh |
| 2009/0285764 A1 | 11/2009 | Singh et al. |
| 2009/0302285 A1 | 12/2009 | Singh |
| 2010/0025619 A1 | 2/2010 | Riva et al. |
| 2010/0044619 A1 | 2/2010 | Hulse et al. |
| 2010/0075046 A1 | 3/2010 | Hakamada et al. |
| 2010/0122545 A1* | 5/2010 | Minor et al. ............ 62/324.1 |
| 2010/0127209 A1 | 5/2010 | Singh et al. |
| 2010/0200798 A1 | 8/2010 | Rao et al. |
| 2011/0162410 A1 | 7/2011 | Low |
| 2011/0173997 A1 | 7/2011 | Low et al. |
| 2011/0258146 A1 | 10/2011 | Low |
| 2011/0260095 A1 | 10/2011 | Low |
| 2012/0096877 A1 | 4/2012 | Yana Motta et al. |
| 2012/0101177 A1 | 4/2012 | Van Horn et al. |
| 2012/0126187 A1 | 5/2012 | Low |
| 2012/0168663 A1 | 7/2012 | Singh et al. |
| 2012/0255316 A1 | 10/2012 | Andre et al. |
| 2013/0096218 A1 | 4/2013 | Rached et al. |

FOREIGN PATENT DOCUMENTS

| | | |
|---|---|---|
| CN | 101864276 | 10/2010 |
| DE | 4116274 | 11/1992 |
| DE | 202007008291 | 11/2007 |
| EP | A0398147 | 11/1990 |
| EP | A0582451 | 2/1994 |
| EP | 0772659 | 9/2001 |
| EP | A1167894 | 1/2002 |
| EP | 1832639 | 9/2007 |
| EP | A1832640 | 9/2007 |
| EP | A1985680 | 10/2008 |
| EP | A-2036943 | 3/2009 |
| EP | 2085422 | 8/2009 |
| EP | A2149592 | 2/2010 |
| EP | A-2246649 | 3/2010 |
| EP | A-2249104 | 10/2010 |
| ER | A-1716216 | 4/2005 |
| FR | 2954342 | 6/2011 |
| GB | A950876 | 2/1964 |
| GB | A2435747 | 9/2007 |
| GB | 2440258 A | 1/2008 |
| GB | A2440258 | 1/2008 |
| JP | 4-110388 | 4/1992 |
| JP | 2003/076747 | 3/2003 |
| RU | 2073058 | 2/1997 |
| WO | WO96/03473 | 2/1996 |
| WO | WO 98/50331 | 11/1998 |
| WO | WO 2004/037752 | 5/2004 |
| WO | WO 2004/037913 | 5/2004 |
| WO | WO 2005/042663 | 5/2005 |
| WO | WO 2005/103190 | 11/2005 |
| WO | WO 2005/103191 | 11/2005 |
| WO | WO 2005/103192 | 11/2005 |
| WO | WO 2005/105947 | 11/2005 |
| WO | WO 2005/108522 | 11/2005 |
| WO | WO 2005/108523 | 11/2005 |
| WO | WO 2006/094303 | 9/2006 |
| WO | WO 2007/002625 | 1/2007 |
| WO | WO 2007/053897 | 5/2007 |
| WO | WO2007053697 | 5/2007 |
| WO | WO 2007/109748 | 9/2007 |
| WO | WO2008/009928 | 1/2008 |
| WO | WO 2008/027555 | 3/2008 |
| WO | WO 2008/065011 | 6/2008 |
| WO | WO 2008/065331 | 6/2008 |
| WO | WO 2008/076272 | 6/2008 |
| WO | WO 2008/121776 | 10/2008 |
| WO | WO 2008/121783 | 10/2008 |
| WO | WO 2008/121785 | 10/2008 |
| WO | WO2008/140809 | 11/2008 |
| WO | WO2009/047535 | 4/2009 |
| WO | WO2009/047542 | 4/2009 |
| WO | WO 2009/134957 | 11/2009 |
| WO | WO 2009/151669 | 12/2009 |
| WO | WO 2010/000993 | 1/2010 |
| WO | WO 2010/000994 | 1/2010 |
| WO | WO2010/000995 | 1/2010 |
| WO | WO 2010/002020 | 1/2010 |
| WO | WO 2010/002023 | 1/2010 |
| WO | WO 2010/075046 | 3/2010 |
| WO | WO 2010/056695 | 5/2010 |
| WO | WO 2010/059677 | 5/2010 |
| WO | WO2010/064005 | 6/2010 |
| WO | WO 2010/075046 | 7/2010 |
| WO | WO 2010/088320 | 8/2010 |
| WO | WO 2010/119265 | 10/2010 |
| WO | WO 2010/129461 | 11/2010 |
| WO | WO 2010/129920 | 11/2010 |

OTHER PUBLICATIONS

NASA Contract NAS-7-918, Technical Support Package on Nearly Azeotropic Mixtures to Replace Refrigerant 12, Aug. 1992.
Poling, B. E. et al., The Properties of Gases and Liquids, 2001, chapters 2, 3, 4, 6, 7 and 8.
Regulation of the European Parliament and of Council on certain Fluorinated Greenhouse Gases, Brussels, 2003.
Rivollet et al, Vapor-liquid equilibrium data for carbon dioxide (CO2) + difluoromethane (R32) system at temperatures . . . , Fluid Phase Equilib., 2004, pp. 95-101.
Takizawa, et al., Reaction stoichiometry for combustion of fluoroethane blends; ASHRAE Trans., 2006, pp. 459-468.
Van Ness et al., Vapor-Liquid Equilibrium, AIChE Journal, 1978, pp. 1055-1063.
Orkin et al., Photochemistry of Bromine-Containing Fluorinated Alkenes: Reactivity toward OH and UV Spectra, J. Phys, Chem., 2002, pp. 10195-10199.
Langley, B.C., Refrigeration and Air Conditioning, 1986, 3rd Edition, pp. 525-526.
Kutz, M., Mechanical Engineers' Handbook, 1998, 2nd Edition, p. 1887.
Puhl, C., Presentation at VDA Winter Meetin at Saalfelden, Feb. 11-12, 2009.
ASHRAE Handbook (2001 Fundamentals Volume), Section 2.
http://en.wikipedia.org/wiki/Total_equivalent_warming_impact.
http://www.sae.org/events/aars/presentations/2007papsavva.pdf, (2007).
US Dept for Commerce, NIST Reference Fluid Thermodynamic and Transport Properties-REFRPROP User Guide, Version 8, Apr. 2007.
ASTM Standard E-681, May 14, 2012.
ASHRAE Standard 34, 1997, p. 12.
Kondo et al. "Flammability limits of multi-fluorinated compounds", Fire Safety Journal, 2006, 41, 46-56.
Kondo et al., "Flammability limits of olefinic and saturated fluoricompounds", Journal of Hazardous Materials, 2009, 171, 613-618.
Han et al., "Isothermal vapour-liquid equilibrium . . . ", J.Chem.Eng. Data, 2006, 51, 1232-1235.
Chen et al., "Gaseous PVT properties of ethyl fluoride", Fluid Phase Equilibria, 2005, 237, 111-116.
Beyerleim et al., "Properties of novel fluorinated compounds . . . ", Fluid Phase Equilibria, 1998, 150-151, 287-296.
ASHRAE Standard 34-2007 Designation and Safety Classification of Refrigerants.
ASHRAE Standard 34—Appendices, 2004.
Table 2.14 Lifetimes, radiative efficiencies and direct, IPCC/TEAP data, 2005.
Barrault et al., Analysis of the economic and environmental consequences of a phase out of considerable reduction leakage . . . , EU Commission Final Report, Feb. 2003.
Montzka et al., The Scientific Assessment of Ozone Depletion 2002. Controlled Substances and Other Source Gases Chapter 1.

(56) References Cited

OTHER PUBLICATIONS

Brown, HFOs New, Low Global Warming potential Refrigerants, ASHRAE Journal, Aug. 2009.

USPTO Office Action dated Jul. 23, 2014 regarding U.S. Appl. No. 14/015,373, 14 pages.

* cited by examiner

Figure 1: Theoretical Performance Data of Selected R-32/R-1234ze(E)/R-134a Blends Containing 4% R32

| R32 (% b/w) | | | | 4 | 4 | 4 | 4 | 4 | 4 | 4 | 4 | 4 |
|---|---|---|---|---|---|---|---|---|---|---|---|---|
| R134a (% b/w) | | | | | 10 | 15 | 20 | 25 | 30 | 35 | 40 | 45 | 50 |
| R1234ze(E) (% b/w) | | | | | 86 | 81 | 76 | 71 | 66 | 61 | 56 | 51 | 46 |
| Calculation results | | 134a | R1234yf | R1234ze(E) | | | | | | | | | |
| Pressure ratio | | 5.79 | 5.24 | 5.75 | 5.79 | 5.77 | 5.76 | 5.74 | 5.73 | 5.71 | 5.70 | 5.70 | 5.69 |
| Volumetric efficiency | | 83.6% | 84.7% | 82.8% | 82.9% | 83.0% | 83.1% | 83.1% | 83.2% | 83.3% | 83.4% | 83.5% | 83.5% |
| condenser glide | K | 0.0 | 0.0 | 0.0 | 3.2 | 3.2 | 3.1 | 3.0 | 2.9 | 2.8 | 2.6 | 2.4 | 2.3 |
| Evaporator glide | K | 0.0 | 0.0 | 0.0 | 1.6 | 1.6 | 1.6 | 1.6 | 1.6 | 1.5 | 1.4 | 1.3 | 1.2 |
| Evaporator inlet T | °C | 0.0 | 0.0 | 0.0 | -0.8 | -0.8 | -0.8 | -0.8 | -0.8 | -0.8 | -0.7 | -0.7 | -0.6 |
| Condenser exit T | °C | 55.0 | 55.0 | 55.0 | 53.4 | 53.4 | 53.4 | 53.5 | 53.5 | 53.6 | 53.7 | 53.8 | 53.9 |
| Condenser P | bar | 16.88 | 16.46 | 12.38 | 14.40 | 14.71 | 15.02 | 15.31 | 15.59 | 15.87 | 16.13 | 16.37 | 16.61 |
| Evaporator P | bar | 2.92 | 3.14 | 2.15 | 2.49 | 2.55 | 2.61 | 2.67 | 2.72 | 2.78 | 2.83 | 2.87 | 2.92 |
| Refrigeration effect | kJ/kg | 123.76 | 94.99 | 108.63 | 115.99 | 116.26 | 116.55 | 116.85 | 117.18 | 117.56 | 117.99 | 118.48 | 119.04 |
| COP | | 2.03 | 1.91 | 2.01 | 2.02 | 2.02 | 2.02 | 2.02 | 2.01 | 2.01 | 2.01 | 2.01 | 2.01 |
| Discharge T | °C | 99.15 | 92.88 | 86.66 | 91.96 | 92.48 | 92.99 | 93.51 | 94.03 | 94.56 | 95.10 | 95.65 | 96.21 |
| Mass flow rate | kg/hr | 174.53 | 227.39 | 198.83 | 186.22 | 185.78 | 185.33 | 184.85 | 184.33 | 183.73 | 183.07 | 182.31 | 181.45 |
| Volumetric flow rate | m3/hr | 13.16 | 14.03 | 18.29 | 15.65 | 15.31 | 14.99 | 14.70 | 14.42 | 14.17 | 13.93 | 13.71 | 13.50 |
| Volumetric capacity | kJ/m3 | 1641 | 1540 | 1181 | 1380 | 1411 | 1441 | 1470 | 1498 | 1525 | 1551 | 1576 | 1600 |
| Pressure drop | kPa/m | 953 | 1239 | 1461 | 1190 | 1162 | 1136 | 1111 | 1088 | 1066 | 1045 | 1026 | 1007 |
| Gas density at evaporator exit | kg/m3 | 13.26 | 16.21 | 10.87 | 11.90 | 12.13 | 12.36 | 12.58 | 12.78 | 12.97 | 13.14 | 13.30 | 13.44 |
| Gas density at condenser inlet | kg/m3 | 86.37 | 99.16 | 67.78 | 75.76 | 77.30 | 78.77 | 80.18 | 81.52 | 82.78 | 83.96 | 85.05 | 86.04 |
| GWP (AR4) | | 1430 | 4 | 6 | 175 | 246 | 318 | 389 | 460 | 531 | 602 | 674 | 745 |
| GWP (TAR) | | | | 6 | 157 | 222 | 287 | 351 | 416 | 481 | 545 | 610 | 675 |
| F/(F+H) | | | | 0.667 | 0.657 | 0.657 | 0.657 | 0.657 | 0.657 | 0.657 | 0.657 | 0.657 | 0.657 |
| Capacity relative to 1234yf | | 106.6% | 100.0% | 76.7% | 97.7% | 89.6% | 91.6% | 93.6% | 95.5% | 97.3% | 99.0% | 100.7% | 102.3% |
| Relative COP | | 106.0% | 100.0% | 105.3% | 105.7% | 105.6% | 105.5% | 105.4% | 105.3% | 105.2% | 105.2% | 105.1% | 105.1% |
| Relative pressure drop | | 76.9% | 100.0% | 117.9% | 85.0% | 96.1% | 93.8% | 91.7% | 89.7% | 87.8% | 86.1% | 84.4% | 82.8% |

Figure 2: Theoretical Performance Data of Selected R-32/R-1234ze(E)/R-134a Blends Containing 6% R32

| R32 (% b/w) | | | | | 6 | 6 | 6 | 6 | 6 | 6 | 6 | 6 | 6 |
|---|---|---|---|---|---|---|---|---|---|---|---|---|---|
| R134a (% b/w) | | | | | 10 | 15 | 20 | 25 | 30 | 35 | 40 | 45 | 50 |
| R1234ze(E) (% b/w) | | | | | 84 | 79 | 74 | 69 | 64 | 59 | 54 | 49 | 44 |
| Calculation results | | 134a | R1234yf | R1234ze(E) | | | | | | | | | |
| Pressure ratio | | 5.79 | 5.24 | 5.75 | 5.80 | 5.78 | 5.76 | 5.74 | 5.73 | 5.71 | 5.70 | 5.69 | 5.69 |
| Volumetric efficiency | | 83.6% | 84.7% | 82.8% | 83.0% | 83.1% | 83.2% | 83.3% | 83.4% | 83.5% | 83.5% | 83.6% | 83.7% |
| condenser glide | K | 0.0 | 0.0 | 0.0 | 4.2 | 4.1 | 4.0 | 3.8 | 3.7 | 3.5 | 3.3 | 3.1 | 2.9 |
| Evaporator glide | K | 0.0 | 0.0 | 0.0 | 2.1 | 2.2 | 2.1 | 2.1 | 2.0 | 1.9 | 1.8 | 1.7 | 1.6 |
| Evaporator inlet T | °C | 0.0 | 0.0 | 0.0 | -1.1 | -1.1 | -1.1 | -1.1 | -1.0 | -1.0 | -0.9 | -0.9 | -0.8 |
| Condenser exit T | °C | 55.0 | 55.0 | 55.0 | 52.9 | 52.9 | 53.0 | 53.1 | 53.2 | 53.3 | 53.4 | 53.5 | 53.6 |
| Condenser P | bar | 16.88 | 16.46 | 12.38 | 15.06 | 15.37 | 15.67 | 15.96 | 16.24 | 16.51 | 16.76 | 17.01 | 17.24 |
| Evaporator P | bar | 2.92 | 3.14 | 2.15 | 2.60 | 2.66 | 2.72 | 2.78 | 2.83 | 2.89 | 2.94 | 2.99 | 3.03 |
| Refrigeration effect | kJ/kg | 123.76 | 94.99 | 108.63 | 119.03 | 119.25 | 119.48 | 119.75 | 120.05 | 120.40 | 120.81 | 121.29 | 121.85 |
| COP | | 2.03 | 1.91 | 2.01 | 2.03 | 2.02 | 2.02 | 2.02 | 2.02 | 2.01 | 2.01 | 2.01 | 2.01 |
| Discharge T | °C | 99.15 | 92.88 | 86.66 | 93.87 | 94.37 | 94.86 | 95.36 | 95.87 | 96.39 | 96.92 | 97.46 | 98.03 |
| Mass flow rate | kg/hr | 174.53 | 227.39 | 198.83 | 181.47 | 181.14 | 180.78 | 180.38 | 179.92 | 179.40 | 178.79 | 178.08 | 177.26 |
| Volumetric flow rate | m3/hr | 13.16 | 14.03 | 18.29 | 14.92 | 14.61 | 14.32 | 14.05 | 13.80 | 13.57 | 13.35 | 13.15 | 12.97 |
| Volumetric capacity | kJ/m3 | 1641 | 1540 | 1181 | 1448 | 1478 | 1508 | 1537 | 1565 | 1592 | 1618 | 1642 | 1666 |
| Pressure drop | kPa/m | 953 | 1239 | 1461 | 1113 | 1088 | 1065 | 1043 | 1023 | 1003 | 985 | 967 | 950 |
| Gas density at evaporator exit | kg/m3 | 13.26 | 16.21 | 10.87 | 12.16 | 12.40 | 12.62 | 12.84 | 13.04 | 13.22 | 13.39 | 13.54 | 13.67 |
| Gas density at condenser inlet | kg/m3 | 86.37 | 99.16 | 67.78 | 77.86 | 79.36 | 80.80 | 82.17 | 83.47 | 84.70 | 85.84 | 86.89 | 87.84 |
| GWP (AR4) | | 1430 | 4 | 6 | 189 | 260 | 331 | 402 | 473 | 545 | 616 | 687 | 758 |
| GWP (TAR) | | | | 6 | 168 | 233 | 297 | 362 | 427 | 492 | 556 | 621 | 686 |
| F/(F+H) | | | | 0.667 | 0.653 | 0.653 | 0.653 | 0.653 | 0.653 | 0.653 | 0.653 | 0.653 | 0.653 |
| Capacity relative to 1234yf | | 106.6% | 100.0% | 76.7% | 97.7% | 94.0% | 96.0% | 98.0% | 99.8% | 101.6% | 103.4% | 105.1% | 106.7% |
| Relative COP | | 106.0% | 100.0% | 105.3% | 106.0% | 105.8% | 105.7% | 105.6% | 105.5% | 105.4% | 105.3% | 105.2% | 105.2% |
| Relative pressure drop | | 76.9% | 100.0% | 117.9% | 85.0% | 89.8% | 87.8% | 85.9% | 84.2% | 82.5% | 81.0% | 79.5% | 78.0% |

Figure 3: Theoretical Performance Data of Selected R-32/R-1234ze(E)/R-134a Blends Containing 8% R32

| R32 (% b/w) | | | | 8 | 8 | 8 | 8 | 8 | 8 | 8 | 8 | 8 |
|---|---|---|---|---|---|---|---|---|---|---|---|---|
| R134a (% b/w) | | | | 10 | 15 | 20 | 25 | 30 | 35 | 40 | 45 | 50 |
| R1234ze(E) (% b/w) | | | | 82 | 77 | 72 | 67 | 62 | 57 | 52 | 47 | 42 |
| Calculation results | | 134a | R1234yf | R1234ze(E) | | | | | | | | |
| Pressure ratio | | 5.79 | 5.24 | 5.75 | 5.80 | 5.78 | 5.76 | 5.74 | 5.72 | 5.71 | 5.70 | 5.69 | 5.68 |
| Volumetric efficiency | | 83.6% | 84.7% | 82.8% | 83.1% | 83.2% | 83.3% | 83.4% | 83.5% | 83.6% | 83.7% | 83.8% | 83.8% |
| condenser glide | K | 0.0 | 0.0 | 0.0 | 5.1 | 4.9 | 4.7 | 4.5 | 4.3 | 4.1 | 3.8 | 3.6 | 3.4 |
| Evaporator glide | K | 0.0 | 0.0 | 0.0 | 2.7 | 2.7 | 2.6 | 2.6 | 2.5 | 2.3 | 2.2 | 2.1 | 2.0 |
| Evaporator inlet T | °C | 0.0 | 0.0 | 0.0 | -1.3 | -1.3 | -1.3 | -1.3 | -1.2 | -1.2 | -1.1 | -1.0 | -1.0 |
| Condenser exit T | °C | 55.0 | 55.0 | 55.0 | 52.5 | 52.5 | 52.6 | 52.7 | 52.9 | 53.0 | 53.1 | 53.2 | 53.3 |
| Condenser P | bar | 16.88 | 16.46 | 12.38 | 15.71 | 16.01 | 16.31 | 16.60 | 16.88 | 17.14 | 17.39 | 17.63 | 17.86 |
| Evaporator P | bar | 2.92 | 3.14 | 2.15 | 2.71 | 2.77 | 2.83 | 2.89 | 2.95 | 3.00 | 3.05 | 3.10 | 3.14 |
| Refrigeration effect | kJ/kg | 123.76 | 94.99 | 108.63 | 121.94 | 122.11 | 122.31 | 122.54 | 122.82 | 123.15 | 123.55 | 124.03 | 124.58 |
| COP | | 2.03 | 1.91 | 2.01 | 2.03 | 2.03 | 2.02 | 2.02 | 2.02 | 2.02 | 2.01 | 2.01 | 2.01 |
| Discharge T | °C | 99.15 | 92.88 | 86.66 | 95.72 | 96.19 | 96.68 | 97.16 | 97.66 | 98.17 | 98.70 | 99.24 | 99.80 |
| Mass flow rate | kg/hr | 174.53 | 227.39 | 198.83 | 177.13 | 176.88 | 176.60 | 176.26 | 175.87 | 175.39 | 174.82 | 174.16 | 173.38 |
| Volumetric flow rate | m3/hr | 13.16 | 14.03 | 18.29 | 14.25 | 13.97 | 13.71 | 13.46 | 13.23 | 13.02 | 12.82 | 12.64 | 12.47 |
| Volumetric capacity | kJ/m3 | 1641 | 1540 | 1181 | 1516 | 1546 | 1576 | 1605 | 1632 | 1659 | 1684 | 1709 | 1732 |
| Pressure drop | kPa/m | 953 | 1239 | 1461 | 1044 | 1022 | 1001 | 982 | 964 | 946 | 930 | 914 | 899 |
| Gas density at evaporator exit | kg/m3 | 13.26 | 16.21 | 10.87 | 12.43 | 12.66 | 12.88 | 13.09 | 13.29 | 13.47 | 13.63 | 13.78 | 13.90 |
| Gas density at condenser inlet | kg/m3 | 86.37 | 99.16 | 67.78 | 79.85 | 81.32 | 82.72 | 84.07 | 85.34 | 86.53 | 87.64 | 88.65 | 89.56 |
| GWP (AR4) | | 1430 | 4 | 6 | 202 | 273 | 344 | 416 | 487 | 558 | 629 | 700 | 772 |
| GWP (TAR) | | | | 6 | 179 | 244 | 308 | 373 | 438 | 502 | 567 | 632 | 697 |
| F/(F+H) | | | | 0.667 | 0.648 | 0.648 | 0.648 | 0.648 | 0.648 | 0.648 | 0.648 | 0.649 | 0.649 |
| Capacity relative to 1234yf | | 106.6% | 100.0% | 76.7% | 97.7% | 98.4% | 100.4% | 102.4% | 104.2% | 106.0% | 107.7% | 109.4% | 111.0% |
| Relative COP | | 106.0% | 100.0% | 105.3% | 106.1% | 106.0% | 105.9% | 105.7% | 105.6% | 105.5% | 105.4% | 105.3% | 105.2% |
| Relative pressure drop | | 76.9% | 100.0% | 117.9% | 85.0% | 84.2% | 82.5% | 80.8% | 79.3% | 77.8% | 76.4% | 75.1% | 73.8% |

Figure 4: Theoretical Performance Data of Selected R-32/R-1234ze(E)/R-134a Blends Containing 10% R32

| R32 (% b/w) | | | | | 10 | 10 | 10 | 10 | 10 | 10 | 10 | 10 |
|---|---|---|---|---|---|---|---|---|---|---|---|---|
| R134a (% b/w) | | | | | 10 | 15 | 20 | 25 | 30 | 35 | 40 | 45 | 50 |
| R1234ze(E) (% b/w) | | | | | 80 | 75 | 70 | 65 | 60 | 55 | 50 | 45 | 40 |
| Calculation results | | 134a | R1234yf | R1234ze(E) | | | | | | | | | |
| Pressure ratio | | 5.79 | 5.24 | 5.75 | 5.79 | 5.77 | 5.75 | 5.73 | 5.71 | 5.70 | 5.69 | 5.68 | 5.67 |
| Volumetric efficiency | | 83.6% | 84.7% | 82.8% | 83.3% | 83.4% | 83.5% | 83.6% | 83.7% | 83.8% | 83.9% | 83.9% | 84.0% |
| condenser glide | K | 0.0 | 0.0 | 0.0 | 5.8 | 5.6 | 5.3 | 5.1 | 4.8 | 4.6 | 4.3 | 4.1 | 3.8 |
| Evaporator glide | K | 0.0 | 0.0 | 0.0 | 3.2 | 3.2 | 3.1 | 3.0 | 2.9 | 2.7 | 2.6 | 2.4 | 2.3 |
| Evaporator inlet T | °C | 0.0 | 0.0 | 0.0 | -1.6 | -1.6 | -1.5 | -1.5 | -1.4 | -1.4 | -1.3 | -1.2 | -1.1 |
| Condenser exit T | °C | 55.0 | 55.0 | 55.0 | 52.1 | 52.2 | 52.3 | 52.5 | 52.6 | 52.7 | 52.8 | 53.0 | 53.1 |
| Condenser P | bar | 16.88 | 16.46 | 12.38 | 16.35 | 16.65 | 16.95 | 17.23 | 17.50 | 17.77 | 18.02 | 18.25 | 18.47 |
| Evaporator P | bar | 2.92 | 3.14 | 2.15 | 2.82 | 2.89 | 2.95 | 3.01 | 3.06 | 3.12 | 3.17 | 3.21 | 3.26 |
| Refrigeration effect | kJ/kg | 123.76 | 94.99 | 108.63 | 124.75 | 124.88 | 125.04 | 125.25 | 125.50 | 125.82 | 126.21 | 126.69 | 127.25 |
| COP | | 2.03 | 1.91 | 2.01 | 2.03 | 2.03 | 2.03 | 2.02 | 2.02 | 2.02 | 2.02 | 2.01 | 2.01 |
| Discharge T | °C | 99.15 | 92.88 | 86.66 | 97.50 | 97.97 | 98.44 | 98.92 | 99.41 | 99.91 | 100.44 | 100.98 | 101.54 |
| Mass flow rate | kg/hr | 174.53 | 227.39 | 198.83 | 173.15 | 172.97 | 172.74 | 172.46 | 172.11 | 171.67 | 171.14 | 170.50 | 169.75 |
| Volumetric flow rate | m3/hr | 13.16 | 14.03 | 18.29 | 13.64 | 13.38 | 13.14 | 12.92 | 12.71 | 12.52 | 12.34 | 12.17 | 12.01 |
| Volumetric capacity | kJ/m3 | 1641 | 1540 | 1181 | 1584 | 1614 | 1643 | 1672 | 1699 | 1726 | 1751 | 1775 | 1798 |
| Pressure drop | kPa/m | 953 | 1239 | 1461 | 982 | 963 | 945 | 927 | 911 | 895 | 880 | 866 | 852 |
| Gas density at evaporator exit | kg/m3 | 13.26 | 16.21 | 10.87 | 12.69 | 12.92 | 13.14 | 13.35 | 13.54 | 13.71 | 13.87 | 14.01 | 14.13 |
| Gas density at condenser inlet | kg/m3 | 86.37 | 99.16 | 67.78 | 81.76 | 83.19 | 84.57 | 85.88 | 87.12 | 88.28 | 89.35 | 90.33 | 91.20 |
| GWP (AR4) | | 1430 | 4 | 6 | 215 | 287 | 358 | 429 | 500 | 571 | 643 | 714 | 785 |
| GWP (TAR) | | | | 6 | 190 | 255 | 319 | 384 | 449 | 513 | 578 | 643 | 707 |
| F/(F+H) | | | | 0.657 | 0.644 | 0.644 | 0.644 | 0.644 | 0.644 | 0.644 | 0.644 | 0.644 | 0.644 |
| Capacity relative to 1234yf | | 106.6% | 100.0% | 76.7% | 97.7% | 102.9% | 104.8% | 106.7% | 108.6% | 110.4% | 112.1% | 113.7% | 115.3% |
| Relative COP | | 106.0% | 100.0% | 105.3% | 106.3% | 106.1% | 106.0% | 105.8% | 105.7% | 105.5% | 105.4% | 105.4% | 105.3% |
| Relative pressure drop | | 76.9% | 100.0% | 117.9% | 85.0% | 79.3% | 77.7% | 76.2% | 74.8% | 73.5% | 72.3% | 71.1% | 69.9% |

Figure 5: Theoretical Performance Data of Selected R-32/R-1234ze(E)/R-134a Blends Containing 12% R32

| R32 (% b/w) | | 134a | R1234yf | R1234ze(E) | 12 | 12 | 12 | 12 | 12 | 12 | 12 | 12 | 12 |
|---|---|---|---|---|---|---|---|---|---|---|---|---|---|
| R134a (% b/w) | | | | | 10 | 15 | 20 | 25 | 30 | 35 | 40 | 45 | 50 |
| R1234ze(E) (% b/w) | | | | | 78 | 73 | 68 | 63 | 58 | 53 | 48 | 43 | 38 |
| Calculation results | | | | | | | | | | | | | |
| Pressure ratio | | 5.79 | 5.24 | 5.75 | 5.78 | 5.76 | 5.74 | 5.72 | 5.70 | 5.69 | 5.67 | 5.67 | 5.66 |
| Volumetric efficiency | | 83.6% | 84.7% | 82.8% | 83.4% | 83.5% | 83.7% | 83.8% | 83.9% | 84.0% | 84.0% | 84.1% | 84.2% |
| condenser glide | K | 0.0 | 0.0 | 0.0 | 6.4 | 6.1 | 5.8 | 5.6 | 5.3 | 5.0 | 4.7 | 4.4 | 4.2 |
| Evaporator glide | K | 0.0 | 0.0 | 0.0 | 3.7 | 3.6 | 3.5 | 3.4 | 3.2 | 3.1 | 2.9 | 2.7 | 2.6 |
| Evaporator inlet T | °C | 0.0 | 0.0 | 0.0 | -1.9 | -1.8 | -1.8 | -1.7 | -1.6 | -1.5 | -1.4 | -1.4 | -1.3 |
| Condenser exit T | °C | 55.0 | 55.0 | 55.0 | 51.8 | 51.9 | 52.1 | 52.2 | 52.4 | 52.5 | 52.7 | 52.8 | 52.9 |
| Condenser P | bar | 16.88 | 16.46 | 12.38 | 16.98 | 17.28 | 17.58 | 17.86 | 18.13 | 18.39 | 18.63 | 18.86 | 19.08 |
| Evaporator P | bar | 2.92 | 3.14 | 2.15 | 2.94 | 3.00 | 3.06 | 3.12 | 3.18 | 3.23 | 3.28 | 3.33 | 3.37 |
| Refrigeration effect | kJ/kg | 123.76 | 94.99 | 108.63 | 127.45 | 127.55 | 127.68 | 127.87 | 128.11 | 128.42 | 128.81 | 129.28 | 129.85 |
| COP | | 2.03 | 1.91 | 2.01 | 2.03 | 2.03 | 2.03 | 2.02 | 2.02 | 2.02 | 2.02 | 2.01 | 2.01 |
| Discharge T | °C | 99.15 | 92.88 | 86.66 | 99.24 | 99.69 | 100.15 | 100.63 | 101.12 | 101.62 | 102.14 | 102.68 | 103.25 |
| Mass flow rate | kg/hr | 174.53 | 227.39 | 198.83 | 169.48 | 169.35 | 169.17 | 168.93 | 168.61 | 168.20 | 167.69 | 167.06 | 166.34 |
| Volumetric flow rate | m3/hr | 13.16 | 14.03 | 18.29 | 13.08 | 12.84 | 12.63 | 12.42 | 12.23 | 12.05 | 11.89 | 11.73 | 11.59 |
| Volumetric capacity | kJ/m3 | 1641 | 1540 | 1181 | 1651 | 1682 | 1711 | 1739 | 1766 | 1792 | 1817 | 1841 | 1863 |
| Pressure drop | kPa/m | 953 | 1239 | 1461 | 927 | 909 | 893 | 878 | 863 | 849 | 835 | 822 | 810 |
| Gas density at evaporator exit | kg/m3 | 13.26 | 16.21 | 10.87 | 12.96 | 13.18 | 13.40 | 13.60 | 13.79 | 13.96 | 14.11 | 14.24 | 14.35 |
| Gas density at condenser inlet | kg/m3 | 86.37 | 99.16 | 67.78 | 83.58 | 84.98 | 86.33 | 87.62 | 88.83 | 89.96 | 91.00 | 91.94 | 92.77 |
| GWP (AR4) | | 1430 | 4 | 6 | 229 | 300 | 371 | 442 | 513 | 585 | 656 | 727 | 798 |
| GWP (TAR) | | | | 6 | 201 | 265 | 330 | 395 | 459 | 524 | 589 | 654 | 718 |
| F/(F+H) | | | | 0.567 | 0.639 | 0.639 | 0.639 | 0.640 | 0.640 | 0.640 | 0.640 | 0.640 | 0.640 |
| Capacity relative to 1234yf | | 106.6% | 100.0% | 76.7% | 97.7% | 107.3% | 109.2% | 111.1% | 112.9% | 114.7% | 116.4% | 118.0% | 119.6% |
| Relative COP | | 106.0% | 100.0% | 105.3% | 106.4% | 106.2% | 106.0% | 105.9% | 105.7% | 105.6% | 105.5% | 105.4% | 105.3% |
| Relative pressure drop | | 76.9% | 100.0% | 117.9% | 85.0% | 74.8% | 73.4% | 72.1% | 70.8% | 69.7% | 68.5% | 67.4% | 66.4% |

Figure 6: Theoretical Performance Data of Selected R-32/R-1234ze(E)/R-134a Blends Containing 14% R32

| R32 (% b/w) | | | 134a | R1234yf | R1234ze(E) | 14 | 14 | 14 | 14 | 14 | 14 | 14 | 14 | 14 |
|---|---|---|---|---|---|---|---|---|---|---|---|---|---|---|
| R134a (% b/w) | | | | | | 10 | 15 | 20 | 25 | 30 | 35 | 40 | 45 | 50 |
| R1234ze(E) (% b/w) | | | | | | 76 | 71 | 66 | 61 | 56 | 51 | 46 | 41 | 36 |
| Calculation results | | | | | | | | | | | | | | |
| Pressure ratio | | | 5.79 | 5.24 | 5.75 | 5.76 | 5.74 | 5.72 | 5.70 | 5.68 | 5.67 | 5.66 | 5.65 | 5.65 |
| Volumetric efficiency | | | 83.6% | 84.7% | 82.8% | 83.6% | 83.7% | 83.8% | 84.0% | 84.1% | 84.1% | 84.2% | 84.3% | 84.4% |
| condenser glide | K | | 0.0 | 0.0 | 0.0 | 6.9 | 6.6 | 6.2 | 5.9 | 5.6 | 5.3 | 5.0 | 4.7 | 4.5 |
| Evaporator glide | K | | 0.0 | 0.0 | 0.0 | 4.2 | 4.0 | 3.9 | 3.7 | 3.6 | 3.4 | 3.2 | 3.0 | 2.9 |
| Evaporator inlet T | °C | | 0.0 | 0.0 | 0.0 | -2.1 | -2.0 | -1.9 | -1.9 | -1.8 | -1.7 | -1.6 | -1.5 | -1.4 |
| Condenser exit T | °C | | 55.0 | 55.0 | 55.0 | 51.6 | 51.7 | 51.9 | 52.0 | 52.2 | 52.4 | 52.5 | 52.6 | 52.8 |
| Condenser P | bar | | 16.88 | 16.46 | 12.38 | 17.61 | 17.91 | 18.20 | 18.48 | 18.74 | 19.00 | 19.24 | 19.47 | 19.68 |
| Evaporator P | bar | | 2.92 | 3.14 | 2.15 | 3.05 | 3.12 | 3.18 | 3.24 | 3.30 | 3.35 | 3.40 | 3.44 | 3.49 |
| Refrigeration effect | kJ/kg | | 123.76 | 94.99 | 108.63 | 130.06 | 130.13 | 130.24 | 130.41 | 130.64 | 130.95 | 131.33 | 131.82 | 132.39 |
| COP | | | 2.03 | 1.91 | 2.01 | 2.04 | 2.03 | 2.03 | 2.02 | 2.02 | 2.02 | 2.02 | 2.01 | 2.01 |
| Discharge T | °C | | 99.15 | 92.88 | 86.66 | 100.93 | 101.37 | 101.83 | 102.30 | 102.79 | 103.29 | 103.82 | 104.36 | 104.93 |
| Mass flow rate | kg/hr | | 174.53 | 227.39 | 198.83 | 166.07 | 165.99 | 165.84 | 165.63 | 165.34 | 164.95 | 164.47 | 163.87 | 163.15 |
| Volumetric flow rate | m3/hr | | 13.16 | 14.03 | 18.29 | 12.56 | 12.35 | 12.15 | 11.96 | 11.79 | 11.62 | 11.47 | 11.33 | 11.20 |
| Volumetric capacity | kJ/m3 | | 1641 | 1540 | 1181 | 1719 | 1749 | 1778 | 1806 | 1833 | 1858 | 1883 | 1906 | 1929 |
| Pressure drop | kPa/m | | 953 | 1239 | 1461 | 877 | 851 | 847 | 833 | 820 | 807 | 795 | 783 | 771 |
| Gas density at evaporator exit | kg/m3 | | 13.26 | 16.21 | 10.87 | 13.22 | 13.44 | 13.65 | 13.85 | 14.03 | 14.19 | 14.34 | 14.46 | 14.57 |
| Gas density at condenser inlet | kg/m3 | | 86.37 | 99.16 | 67.78 | 85.32 | 86.71 | 88.03 | 89.29 | 90.47 | 91.57 | 92.57 | 93.48 | 94.27 |
| GWP (AR4) | | | 1430 | 4 | 6 | 242 | 313 | 384 | 456 | 527 | 598 | 669 | 740 | 812 |
| GWP (TAR) | | | | | 6 | 212 | 276 | 341 | 406 | 470 | 535 | 600 | 664 | 729 |
| F/(F+H) | | | | | 0.667 | 0.635 | 0.635 | 0.635 | 0.635 | 0.635 | 0.636 | 0.636 | 0.636 | 0.636 |
| Capacity relative to 1234yf | | | 106.6% | 100.0% | 76.7% | 97.7% | 111.7% | 113.6% | 115.5% | 117.3% | 119.0% | 120.7% | 122.3% | 123.8% |
| Relative COP | | | 106.0% | 100.0% | 105.3% | 106.5% | 106.3% | 106.1% | 105.9% | 105.7% | 105.6% | 105.5% | 105.4% | 105.3% |
| Relative pressure drop | | | 76.9% | 100.0% | 117.9% | 85.0% | 70.8% | 69.5% | 68.3% | 67.2% | 66.2% | 65.1% | 64.1% | 63.2% |

HEAT TRANSFER COMPOSITIONS

RELATED APPLICATIONS

This application is a continuation of patent application Ser. No. 13/028,494 filed 16 Feb. 2011 (now U.S. Pat. No. 8,333,901) which claims priority to Great Britain application No. 1002619.3 filed 16 Feb. 2010.

BACKGROUND OF THE INVENTION

The invention relates to heat transfer compositions, and in particular to heat transfer compositions which may be suitable as replacements for existing refrigerants such as R-134a, R-152a, R-1234yf, R-22, R-410A, R-407A, R-407B, R-407C, R507 and R-404a.

The listing or discussion of a prior-published document or any background in the specification should not necessarily be taken as an acknowledgement that a document or background is part of the state of the art or is common general knowledge.

Mechanical refrigeration systems and related heat transfer devices such as heat pumps and air-conditioning systems are well known. In such systems, a refrigerant liquid evaporates at low pressure taking heat from the surrounding zone. The resulting vapour is then compressed and passed to a condenser where it condenses and gives off heat to a second zone, the condensate being returned through an expansion valve to the evaporator, so completing the cycle. Mechanical energy required for compressing the vapour and pumping the liquid is provided by, for example, an electric motor or an internal combustion engine.

In addition to having a suitable boiling point and a high latent heat of vaporisation, the properties preferred in a refrigerant include low toxicity, non-flammability, non-corrosivity, high stability and freedom from objectionable odour. Other desirable properties are ready compressibility at pressures below 25 bars, low discharge temperature on compression, high refrigeration capacity, high efficiency (high coefficient of performance) and an evaporator pressure in excess of 1 bar at the desired evaporation temperature.

Dichlorodifluoromethane (refrigerant R-12) possesses a suitable combination of properties and was for many years the most widely used refrigerant. Due to international concern that fully and partially halogenated chlorofluorocarbons were damaging the earth's protective ozone layer, there was general agreement that their manufacture and use should be severely restricted and eventually phased out completely. The use of dichlorodifluoromethane was phased out in the 1990's.

Chlorodifluoromethane (R-22) was introduced as a replacement for R-12 because of its lower ozone depletion potential. Following concerns that R-22 is a potent greenhouse gas, its use is also being phased out.

Whilst heat transfer devices of the type to which the present invention relates are essentially closed systems, loss of refrigerant to the atmosphere can occur due to leakage during operation of the equipment or during maintenance procedures. It is important, therefore, to replace fully and partially halogenated chlorofluorocarbon refrigerants by materials having zero ozone depletion potentials.

In addition to the possibility of ozone depletion, it has been suggested that significant concentrations of halocarbon refrigerants in the atmosphere might contribute to global warming (the so-called greenhouse effect). It is desirable, therefore, to use refrigerants which have relatively short atmospheric lifetimes as a result of their ability to react with other atmospheric constituents such as hydroxyl radicals or as a result of ready degradation through photolytic processes.

R-410A and R-407 (including R-407A, R-407B and R-407C) have been introduced as a replacement refrigerant for R-22. However, R-22, R-410A and R-407 all have a high global warming potential (GWP, also known as greenhouse warming potential).

1,1,1,2-tetrafluoroethane (refrigerant R-134a) was introduced as a replacement refrigerant for R-12. However, despite having a low ozone depletion potential, R-134a has a GWP of 1300. It would be desirable to find replacements for R-134a that have a lower GWP.

R-152a (1,1-difluoroethane) has been identified as an alternative to R-134a. It is somewhat more efficient than R-134a and has a greenhouse warming potential of 120. However the flammability of R-152a is judged too high, for example to permit its safe use in mobile air conditioning systems. In particular it is believed that its lower flammable limit in air is too low, its flame speeds are too high, and its ignition energy is too low.

Thus there is a need to provide alternative refrigerants having improved properties such as low flammability. Fluorocarbon combustion chemistry is complex and unpredictable. It is not always the case that mixing a non flammable fluorocarbon with a flammable fluorocarbon reduces the flammability of the fluid. For example, the inventors have found that if non flammable R-134a is mixed with flammable R-152a, the lower flammable limit of the mixture can be reduced relative to that of pure R-152a (i.e. the mixture can be more flammable than pure R-152a). The situation is rendered even more complex and less predictable if ternary compositions are considered.

There is also a need to provide alternative refrigerants that may be used in existing devices such as refrigeration devices with little or no modification.

R-1234yf (2,3,3,3-tetrafluoropropene) has been identified as a candidate alternative refrigerant to replace R-134a in certain applications, notably the mobile air conditioning or heat pumping applications. Its GWP is about 4. R-1234yf is flammable but its flammability characteristics are generally regarded as acceptable for some applications including mobile air conditioning or heat pumping. In particular its lower flammable limit, ignition energy and flame speed are all significantly lower than that of R-152a.

The environmental impact of operating an air conditioning or refrigeration system, in terms of the emissions of greenhouse gases, should be considered with reference not only to the so-called "direct" GWP of the refrigerant, but also with reference to the so-called "indirect" emissions, meaning those emissions of carbon dioxide resulting from consumption of electricity or fuel to operate the system. Several metrics of this total GWP impact have been developed, including those known as Total Equivalent Warming Impact (TEWI) analysis, or Life-Cycle Carbon Production (LCCP) analysis. Both of these measures include estimation of the effect of refrigerant GWP and energy efficiency on overall warming impact.

The energy efficiency and refrigeration capacity of R-1234yf have been found to be significantly lower than those of R-134a and in addition the fluid has been found to exhibit increased pressure drop in system pipework and heat exchangers. A consequence of this is that to use R-1234yf and achieve energy efficiency and cooling performance equivalent to R-134a, increased complexity of equipment and increased size of pipework is required, leading to an increase in indirect emissions associated with equipment. Furthermore, the production of R-1234yf is thought to be more complex and less efficient in its use of raw materials (fluorinated and chlorinated) than R-134a. So the adoption of R-1234yf to replace R-134a will consume more raw materials and result in more indirect emissions of greenhouse gases than does R-134a.

Some existing technologies designed for R-134a may not be able to accept even the reduced flammability of some heat transfer compositions (any composition having a GWP of less than 150 is believed to be flammable to some extent).

A principal object of the present invention is therefore to provide a heat transfer composition which is usable in its own right or suitable as a replacement for existing refrigeration usages which should have a reduced GWP, yet have a capacity and energy efficiency (which may be conveniently expressed as the "Coefficient of Performance") ideally within 20% of the values, for example of those attained using existing refrigerants (e.g. R-134a, R-152a, R-1234yf, R-22, R-410A, R-407A, R-407B, R-407C, R507 and R-404a), and preferably within 10% or less (e.g. about 5%) of these values. It is known in the art that differences of this order between fluids are usually resolvable by redesign of equipment and system operational features without entailing significant cost differences. The composition should also ideally have reduced toxicity and acceptable flammability.

SUMMARY OF THE INVENTION

The subject invention addresses the above deficiencies by the provision of a heat transfer composition comprising difluoromethane (R-32), 1,1,1,2-tetrafluoroethane (R-134a) and trans-1,3,3,3-tetrafluoropropene (R-1234ze (E)). These will be referred to as the compositions of the invention, unless otherwise stated.

R-32 typically is present in the compositions of the invention in up to about 20% by weight, for example from about 4 to about 18% by weight.

R-134a suitably is present in the compositions of the invention in up to about 50% by weight, for example from about 10 to about 50% by weight.

R-1234ze (E) typically is present in the compositions of the invention in amounts from about 30 to about 90% by weight.

For example, the compositions of the invention may contain from about 3 to about 16% by weight R-32, from about 10 to about 50% by weight R-134a, and from about 35 to about 90% R-1234ze (E).

Preferably, the compositions of the invention contain from about 4 to about 14% by weight R-32, from about 10 to about 50% by weight R-134a, and from about 35 to about 85% R-1234ze (E).

Conveniently, the compositions of the invention contain from about 4 to about 9% by weight R-32, from about 10 to about 50% by weight R-134a, and from about 45 to about 85% R-1234ze (E).

Advantageously, the compositions of the invention contain from about 9 to 14% by weight R-32, from about 10 to about 40% by weight R-134a, and from about 50 to about 80% R-1234ze (E).

BRIEF DESCRIPTION OF THE DRAWINGS

FIG. 1 provides a table of theoretical performance data of compositions according to the present invention containing 4% R-32.

FIG. 2 provides a table of theoretical performance data of compositions according to the present invention containing 6% R-32.

FIG. 3 provides a table of theoretical performance data of compositions according to the present invention containing 8% R-32.

FIG. 4 provides a table of theoretical performance data of compositions according to the present invention containing 10% R-32.

FIG. 5 provides a table of theoretical performance data of compositions according to the present invention containing 12% R-32.

FIG. 6 provides a table of theoretical performance data of compositions according to the present invention containing 14% R-32.

DETAILED DESCRIPTION

In a preferred embodiment, the compositions of the invention consist essentially of R-32, R-134a and R-1234ze (E).

By the term "consisting essentially of", we mean that the compositions contain substantially no other components, particularly no further compounds known to be used in heat transfer compositions. We include the term "consisting of" within the meaning of "consisting essentially of".

For the avoidance of doubt, any of the compositions of the invention described herein with specifically defined amounts of R-32, R-134a and R-1234ze (E) may consist essentially of (or consist of) those amounts of R-32, R-134a and R-1234ze (E) in the compositions.

All of the chemicals herein described are commercially available. For example, the fluorochemicals may be obtained from Apollo Scientific (UK).

As used herein, all % amounts mentioned in compositions herein, including in the claims, are by weight based on the total weight of the compositions, unless otherwise stated.

Compositions according to the invention conveniently comprise substantially no R-1225 (pentafluoropropene), conveniently substantially no R-1225ye (1,2,3,3,3-pentafluoropropene) or R-1225zc (1,1,3,3,3-pentafluoropropene), which compounds may have associated toxicity issues.

By "substantially no", we include the meaning that the compositions of the invention contain 0.5% by weight or less of the stated component, preferably 0.1% or less, based on the total weight of the composition.

The compositions of the invention may contain substantially no:
(i) 2,3,3,3-tetrafluoropropene (R-1234yf),
(ii) cis-1,3,3,3-tetrafluoropropene (R-1234ze (Z)), and/or
(iii) 3,3,3-tetrafluoropropene (R-1243zf).

In a preferred embodiment, the compositions of the invention consist essentially of (or consist of) R-1234ze (E), R-152a, and R-134a in the amounts specified above. In other words, these are ternary compositions.

The compositions of the invention have zero ozone depletion potential.

Preferably, the compositions of the invention (e.g. those that are suitable refrigerant replacements for R-134a, R-1234yf or R-152a) have a GWP that is less than 1300, preferably less than 1000, more preferably less than 500, 400, 300 or 200. Unless otherwise stated, IPCC (Intergovernmental Panel on Climate Change) TAR (Third Assessment Report) values of GWP have been used herein.

Advantageously, the compositions are of reduced flammability hazard when compared to the individual flammable components of the compositions, e.g. R-32. Preferably, the compositions are of reduced flammability hazard when compared to R-1234yf.

In one aspect, the compositions have one or more of (a) a higher lower flammable limit; (b) a higher ignition energy; or (c) a lower flame velocity compared to R-32 or R-1234yf. In a preferred embodiment, the compositions of the invention are non-flammable. Advantageously, the mixtures of vapour that exist in equilibrium with the compositions of the invention at any temperature between about −20° C. and 60° C. are also non-flammable.

Flammability may be determined in accordance with ASHRAE Standard 34 incorporating the ASTM Standard E-681 with test methodology as per Addendum 34p dated 2004, the entire content of which is incorporated herein by reference.

In some applications it may not be necessary for the formulation to be classed as non-flammable by the ASHRAE 34 methodology; it is possible to develop fluids whose flammability limits will be sufficiently reduced in air to render them safe for use in the application, for example if it is physically not possible to make a flammable mixture by leaking the refrigeration equipment charge into the surrounds. We have found that the effect of adding R-134a and R-1234ze (E) to flammable refrigerant R-32 is to modify the flammability in mixtures with air in this manner.

Temperature glide, which can be thought of as the difference between bubble point and dew point temperatures of a zeotropic (non-azeotropic) mixture at constant pressure, is a characteristic of a refrigerant; if it is desired to replace a fluid with a mixture then it is often preferable to have similar or reduced glide in the alternative fluid. In an embodiment, the compositions of the invention are zeotropic.

Conveniently, the temperature glide (in the evaporator) of the compositions of the invention is less than about 10K, for example less than about 5K or 3K.

Advantageously, the volumetric refrigeration capacity of the compositions of the invention is at least 85% of the existing refrigerant fluid it is replacing, preferably at least 90% or even at least 95%.

The compositions of the invention typically have a volumetric refrigeration capacity that is at least 90% of that of R-1234yf. Preferably, the compositions of the invention have a volumetric refrigeration capacity that is at least 95% of that of R-1234yf, for example from about 95% to about 120% of that of R-1234yf.

In one embodiment, the cycle efficiency (Coefficient of Performance, COP) of the compositions of the invention is within about 5% or even better than the existing refrigerant fluid it is replacing.

Conveniently, the compressor discharge temperature of the compositions of the invention is within about 15K of the existing refrigerant fluid it is replacing, preferably about 10K or even about 5K.

The compositions of the invention preferably have energy efficiency at least 95% (preferably at least 98%) of R-134a under equivalent conditions, while having reduced or equivalent pressure drop characteristic and cooling capacity at 95% or higher of R-134a values. Advantageously the compositions have higher energy efficiency and lower pressure drop characteristics than R-134a under equivalent conditions. The compositions also advantageously have better energy efficiency and pressure drop characteristics than R-1234yf alone.

The heat transfer compositions of the invention are suitable for use in existing designs of equipment, and are compatible with all classes of lubricant currently used with established HFC refrigerants. They may be optionally stabilized or compatibilized with mineral oils by the use of appropriate additives.

Preferably, when used in heat transfer equipment, the composition of the invention is combined with a lubricant.

Conveniently, the lubricant is selected from the group consisting of mineral oil, silicone oil, polyalkyl benzenes (PABs), polyol esters (POEs), polyalkylene glycols (PAGs), polyalkylene glycol esters (PAG esters), polyvinyl ethers (PVEs), poly (alpha-olefins) and combinations thereof.

Advantageously, the lubricant further comprises a stabiliser.

Preferably, the stabiliser is selected from the group consisting of diene-based compounds, phosphates, phenol compounds and epoxides, and mixtures thereof.

Conveniently, the composition of the invention may be combined with a flame retardant.

Advantageously, the flame retardant is selected from the group consisting of tri-(2-chloroethyl)-phosphate, (chloropropyl)phosphate, tri-(2,3-dibromopropyl)-phosphate, tri-(1,3-dichloropropyl)-phosphate, diammonium phosphate, various halogenated aromatic compounds, antimony oxide, aluminium trihydrate, polyvinyl chloride, a fluorinated iodocarbon, a fluorinated bromocarbon, trifluoro iodomethane, perfluoroalkyl amines, bromo-fluoroalkyl amines and mixtures thereof.

Preferably, the heat transfer composition is a refrigerant composition.

In one embodiment, the invention provides a heat transfer device comprising a composition of the invention.

Preferably, the heat transfer device is a refrigeration device.

Conveniently, the heat transfer device is selected from group consisting of automotive air conditioning systems, residential air conditioning systems, commercial air conditioning systems, residential refrigerator systems, residential freezer systems, commercial refrigerator systems, commercial freezer systems, chiller air conditioning systems, chiller refrigeration systems, and commercial or residential heat pump systems. Preferably, the heat transfer device is a refrigeration device or an air-conditioning system.

Advantageously, the heat transfer device contains a centrifugal-type compressor.

The invention also provides the use of a composition of the invention in a heat transfer device as herein described.

According to a further aspect of the invention, there is provided a blowing agent comprising a composition of the invention.

According to another aspect of the invention, there is provided a foamable composition comprising one or more components capable of forming foam and a composition of the invention.

Preferably, the one or more components capable of forming foam are selected from polyurethanes, thermoplastic polymers and resins, such as polystyrene, and epoxy resins.

According to a further aspect of the invention, there is provided a foam obtainable from the foamable composition of the invention.

Preferably the foam comprises a composition of the invention.

According to another aspect of the invention, there is provided a sprayable composition comprising a material to be sprayed and a propellant comprising a composition of the invention.

According to a further aspect of the invention, there is provided a method for cooling an article which comprises condensing a composition of the invention and thereafter evaporating said composition in the vicinity of the article to be cooled.

According to another aspect of the invention, there is provided a method for heating an article which comprises condensing a composition of the invention in the vicinity of the article to be heated and thereafter evaporating said composition.

According to a further aspect of the invention, there is provided a method for extracting a substance from biomass comprising contacting the biomass with a solvent comprising a composition of the invention, and separating the substance from the solvent.

According to another aspect of the invention, there is provided a method of cleaning an article comprising contacting the article with a solvent comprising a composition of the invention.

According to a further aspect of the invention, there is provided a method for extracting a material from an aqueous solution comprising contacting the aqueous solution with a solvent comprising a composition of the invention, and separating the material from the solvent.

According to another aspect of the invention, there is provided a method for extracting a material from a particulate solid matrix comprising contacting the particulate solid matrix with a solvent comprising a composition of the invention, and separating the material from the solvent.

According to a further aspect of the invention, there is provided a mechanical power generation device containing a composition of the invention.

Preferably, the mechanical power generation device is adapted to use a Rankine Cycle or modification thereof to generate work from heat.

According to another aspect of the invention, there is provided a method of retrofitting a heat transfer device comprising the step of removing an existing heat transfer fluid, and introducing a composition of the invention. Preferably, the heat transfer device is a refrigeration device or (a static) air conditioning system. Advantageously, the method further comprises the step of obtaining an allocation of greenhouse gas (e.g. carbon dioxide) emission credit.

In accordance with the retrofitting method described above, an existing heat transfer fluid can be fully removed from the heat transfer device before introducing a composition of the invention. An existing heat transfer fluid can also be partially removed from a heat transfer device, followed by introducing a composition of the invention.

In another embodiment wherein the existing heat transfer fluid is R-134a, R-1234ze (E) and R-32 (and optional components as a lubricant, a stabiliser or a flame retardant) can be added to the R-134a in the heat transfer device, thereby forming the compositions of the invention, and the heat transfer device of the invention, in situ. Some of the existing R-134a may be removed from the heat transfer device prior to adding the R-1234ze (E), R-32, etc to facilitate providing the components of the compositions of the invention in the desired proportions.

Thus, the invention provides a method for preparing a composition and/or heat transfer device of the invention comprising introducing R-1234ze (E) and R-32, and optional components such as a lubricant, a stabiliser or a flame retardant, into a heat transfer device containing an existing heat transfer fluid which is R-134a. Optionally, some of the R-134a is removed from the heat transfer device before introducing the R-1234ze (E), R-32, etc.

Of course, the compositions of the invention may also be prepared simply by mixing the R-1234ze (E), R-32 and R-134a (and optional components such as a lubricant, a stabiliser or an additional flame retardant) in the desired proportions. The compositions can then be added to a heat transfer device (or used in any other way as defined herein) that does not contain R-134a or any other existing heat transfer fluid, such as a device from which R-134a or any other existing heat transfer fluid have been removed.

In a further aspect of the invention, there is provided a method for reducing the environmental impact arising from operation of a product comprising an existing compound or composition, the method comprising replacing at least partially the existing compound or composition with a composition of the invention. Preferably, this method comprises the step of obtaining an allocation of greenhouse gas emission credit.

By environmental impact we include the generation and emission of greenhouse warming gases through operation of the product.

As mentioned above, this environmental impact can be considered as including not only those emissions of compounds or compositions having a significant environmental impact from leakage or other losses, but also including the emission of carbon dioxide arising from the energy consumed by the device over its working life. Such environmental impact may be quantified by the measure known as Total Equivalent Warming Impact (TEWI). This measure has been used in quantification of the environmental impact of certain stationary refrigeration and air conditioning equipment, including for example supermarket refrigeration systems (see, for example, http://en.wikipedia.org/wiki/Total equivalent warming imp act).

The environmental impact may further be considered as including the emissions of greenhouse gases arising from the synthesis and manufacture of the compounds or compositions. In this case the manufacturing emissions are added to the energy consumption and direct loss effects to yield the measure known as Life-Cycle Carbon Production (LCCP, see for example http://www.sae.org/events/aars/presentations/2007papasavva.pdf). The use of LCCP is common in assessing environmental impact of automotive air conditioning systems.

Emission credit(s) are awarded for reducing pollutant emissions that contribute to global warming and may, for example, be banked, traded or sold. They are conventionally expressed in the equivalent amount of carbon dioxide. Thus if the emission of 1 kg of R-134a is avoided then an emission credit of 1×1300=1300 kg CO2 equivalent may be awarded.

In another embodiment of the invention, there is provided a method for generating greenhouse gas emission credit(s) comprising (i) replacing an existing compound or composition with a composition of the invention, wherein the composition of the invention has a lower GWP than the existing compound or composition; and (ii) obtaining greenhouse gas emission credit for said replacing step.

In a preferred embodiment, the use of the composition of the invention results in the equipment having a lower Total Equivalent Warming Impact, and/or a lower Life-Cycle Carbon Production than that which would be attained by use of the existing compound or composition.

These methods may be carried out on any suitable product, for example in the fields of air-conditioning, refrigeration (e.g. low and medium temperature refrigeration), heat transfer, blowing agents, aerosols or sprayable propellants, gaseous dielectrics, cryosurgery, veterinary procedures, dental procedures, fire extinguishing, flame suppression, solvents (e.g. carriers for flavorings and fragrances), cleaners, air horns, pellet guns, topical anesthetics, and expansion applications. Preferably, the field is air-conditioning or refrigeration.

Examples of suitable products include a heat transfer devices, blowing agents, foamable compositions, sprayable compositions, solvents and mechanical power generation devices. In a preferred embodiment, the product is a heat transfer device, such as a refrigeration device or an air-conditioning unit.

The existing compound or composition has an environmental impact as measured by GWP and/or TEWI and/or LCCP that is higher than the composition of the invention which replaces it. The existing compound or composition may comprise a fluorocarbon compound, such as a perfluoro-, hydrofluoro-, chlorofluoro- or hydrochlorofluoro-carbon compound or it may comprise a fluorinated olefin.

Preferably, the existing compound or composition is a heat transfer compound or composition such as a refrigerant. Examples of refrigerants that may be replaced include R-134a, R-152a, R-1234yf, R-410A, R-407A, R-407B, R-407C, R507, R-22 and R-404A. The compositions of the invention are particularly suited as replacements for R-134a, R-152a or R-1234yf.

Any amount of the existing compound or composition may be replaced so as to reduce the environmental impact. This may depend on the environmental impact of the existing compound or composition being replaced and the environmental impact of the replacement composition of the invention. Preferably, the existing compound or composition in the product is fully replaced by the composition of the invention.

The invention is illustrated by the following non-limiting examples, as well as information and tables included in the attached FIGS. 1-6.

EXAMPLES

Performance of a R-32/R-134a/R-1234ze Blend

An instrumented laboratory chiller was used to evaluate the performance of a ternary blend of R-32/R-134a/R-1234ze (E) (7%/46%/47% weight basis) over a range of evaporating and condensing temperatures. The chiller used a fixed displacement reciprocating compressor with polyolester (POE) lubricant and cooled glycol in a counter-current flow heat exchanger against evaporating refrigerant. The refrigerant was condensed in a counter-current flow heat exchanger using cooling water. The comparative tests were run at fixed compressor displacement and the flowrates of heat transfer fluids were controlled to maintain a constant and equal bubblepoint of refrigerant in the condenser, and a constant evaporator inlet temperature of refrigerant. The performance was evaluated at condenser bubblepoint temperatures of 30° C. and 40° C. and over a range of evaporator inlet temperatures from −35° C. to +5° C.

Data are reproduced below for the measured cooling capacity of the ternary blend at selected evaporation temperatures and at 40° C. bubblepoint temperature in the condenser. The blend provides somewhat higher capacity than R-134a at these conditions. The energy efficiency (expressed as Coefficient of Performance COP) was also measured; the two fluids had comparable COP within experimental error over the entire range of evaporating temperatures. The compressor discharge temperature was also monitored and it was found that the blend discharge temperature was within 5K of the R-134a discharge temperature over the range of evaporating conditions.

| Evaporator Inlet Temp ° C. | R134a capacity KW | Blend capacity kW |
|---|---|---|
| 5 | 1.41 | 1.54 |
| 0 | 1.16 | 1.26 |
| −5 | 0.91 | 0.97 |
| −10 | 0.71 | .77 |
| −15 | 0.56 | 0.6 |
| −20 | 0.4 | 0.43 |
| −25 | 0.26 | 0.28 |

The data measured at 30° C. bubblepoint temperature displayed similar trends of slightly increased capacity, equivalent COP and similar compressor discharge temperature.

Lubricant Miscibility

The miscibility of a ternary blend of R-32/R-134a/R-1234ze (E) (7%/46%/47% weight basis) was tested with the polyalkylene glycol (PAG) lubricant ND8. The ND8 concentration was 10% by weight. The results (see below) show that the blend has excellent miscibility from 0 to 65° C.

| Temperare ° C. | Miscibility |
|---|---|
| −20 | slightly opaque |
| −10 | slightly opaque |
| 0 | v slightly opaque |
| 10 | Miscible |
| 20 | Miscible |
| 25 | Miscible |
| 30 | Miscible |
| 35 | Miscible |
| 40 | Miscible |
| 45 | Miscible |
| 60 | Miscible |
| 55 | Miscible |
| 60 | Miscible |
| 65 | Miscible |
| 70 | 2 layers |
| 80 | 2 layers |

Modeled Performance of R-32/R-134a/R-1234ze Blends

The performance of selected ternary compositions of the invention was estimated using a thermodynamic property model in conjunction with an idealised vapour compression cycle. The thermodynamic model used the Peng Robinson equation of state to represent vapour phase properties and vapour-liquid equilibrium of the mixtures, together with a polynomial correlation of the variation of ideal gas enthalpy of each component of the mixtures with temperature. The principles behind use of this equation of state to model thermodynamic properties and vapour liquid equilibrium are explained more fully in The Properties of Gases and Liquids (5th edition) by B E Poling, J M Prausnitz and J M O'Connell pub. McGraw Hill 2000, in particular Chapters 4 and 8 (which is incorporated herein by reference).

The basic property data required to use this model were: critical temperature and critical pressure; vapour pressure and the related property of Pitzer eccentric factor; ideal gas enthalpy, and measured vapour liquid equilibrium data for the binary pairs between the components of the mixture.

The basic property data (critical properties, eccentric factor, vapour pressure and ideal gas enthalpy) for R-32 and R-134a were taken from the NIST REFPROP Version 8.0 software, which is incorporated herein by reference. The critical point and vapour pressure for R-1234ze (E) were measured experimentally. The ideal gas enthalpy for R-1234ze (E) over a range of temperatures was estimated using the molecular modeling software Hyperchem 7.5, which is incorporated herein by reference.

Vapour liquid equilibrium data for the binary mixture of R-32 and R-134a was available from Nagel & Bier, Int J Refrig 1995 (18) 534-543 and was regressed to the Peng Robinson equation using a binary interaction constant incorporated into van der Waal's mixing rules. No vapour liquid equilibrium data were available for R-32 with R-1234ze (E) so the interaction constant for this pair was set to zero. Although Minor et al in WO2006/094303 indicated the presence of an azeotrope between R-134a and R-1234ze (E), experimentation showed no such azeotrope to exist. The interaction constant for this pair was regressed to experimentally determined data on pressure and composition of liquid and vapour phases measured using an isothermal recirculating still apparatus.

The refrigeration performance of selected ternary compositions of the invention was modeled using the following cycle conditions.

| | |
|---|---|
| Condensing temperature (° C.) | 60 |
| Evaporating temperature (° C.) | 0 |
| Subcool (K) | 5 |
| Superheat (K) | 5 |
| Suction temperature (° C.) | 15 |
| Isentropic efficiency | 65% |
| Clearance ratio | 4% |
| Duty (kW) | 6 |
| Suction line diameter (mm) | 16.2 |

The refrigeration performance data of these compositions are set out in the following tables.

The compositions of the invention show improved system performance relative to 1234yf: cooling capacity is close to or exceeds that of 1234yf while the theoretical energy efficiency of the compositions also exceeds that of 1234yf. In some cases cooling capacities higher than 134a can also be achieved. The compositions of the invention also offer reduced pressure drop losses as compared to 1234yf. The pressure drop in the suction line is of particular relevance for automotive air conditioning systems and it is desirable to reduce this pressure loss as much as possible.

The invention claimed is:

1. A heat transfer composition comprising 30-90% by weight trans-1,3,3,3-tetrafluoropropene (R-1234ze(E)), R-32 and 10-50% by weight 1,1,1,2-tetrafluoroethane (R-134a), wherein the composition comprises substantially no R-1243zf.

2. A composition according to claim 1 containing up to about 20% by weight R-32.

3. A heat transfer composition according to claim 1, containing from about 4 to about 20% by weight R-32.

4. A method for reducing the environmental impact arising from the operation of a product comprising an existing compound or composition, the method comprising replacing at least partially the existing compound or composition with a composition as defined in claim 1.

5. A composition according to claim 1 containing from about 4 to about 16% by weight R-32, from about 10 to about 50% by weight R-134a, and from about 35 to about 90% R-1234ze(E).

6. A composition according to claim 5 containing from about 4 to about 14% by weight R-32, from about 10 to about 50% by weight R-134a, and from about 35 to about 85% R-1234ze(E).

7. A composition according to claim 1, consisting essentially of R-1234ze(E), R-32 and R-134a.

8. A composition according to claim 1, wherein the composition has a GWP of less than 1000, preferably less than 150.

9. A composition according to claim 1, wherein the temperature glide is less than about 10K, preferably less than about 5K.

10. A composition according to claim 1, wherein the composition has a volumetric refrigeration capacity within about 15%, preferably within about 10% of the existing refrigerant that it is intended to replace.

11. A composition according to claim 1, wherein the composition is less flammable than R-32 alone or R-1234yf alone.

12. A composition according to claim 11 which is non-flammable.

13. A composition according to claim 1, wherein the composition has a cycle efficiency within about 5% of the existing refrigerant that it is intended to replace.

14. A composition according to claim 1, wherein the composition has a compressor discharge temperature within about 15K, preferably within about 10K, of the existing refrigerant that it is intended to replace.

15. A composition according to claim 1 further comprising a lubricant.

16. A composition according to claim 11 wherein the composition has:
    (a) a higher flammable limit;
    (b) a higher ignition energy; and/or
    (c) a lower flame velocity compared to R-32 alone or R-1234yf alone.

17. A composition according to claim 15, wherein the lubricant is selected from mineral oil, silicone oil, polyalkyl benzenes (PABs), polyol esters (POEs), polyalkylene glycols (PAGs), polyalkylene glycol esters (PAG esters), polyvinyl ethers (PVEs), poly (alpha-olefins) and combinations thereof.

18. A composition according to claim 1 further comprising a stabiliser.

19. A composition according to claim 18, wherein the stabiliser is selected from diene-based compounds, phosphates, phenol compounds and epoxides, and mixtures thereof.

20. A composition according to claim 1 further comprising a flame retardant.

21. A composition according to claim 20, wherein the flame retardant is selected from the group consisting of tri-(2-chloroethyl)-phosphate, (chloropropyl) phosphate, tri-(2,3-dibromopropyl)-phosphate, tri-(1,3-dichloropropyl)-phosphate, diammonium phosphate, various halogenated aromatic compounds, antimony oxide, aluminium trihydrate, polyvinyl chloride, a fluorinated iodocarbon, a fluorinated bromocarbon, trifluoro iodomethane, perfluoroalkyl amines, bromo-fluoroalkyl amines and mixtures thereof.

22. A composition according to claim 1 which is a refrigerant composition.

23. A heat transfer device containing a composition as defined in claim 1.

24. A method according to claim 4 wherein the product is selected from a heat transfer device, a blowing agent, a foamable composition, a sprayable composition, a solvent or a mechanical power generation device.

25. A heat transfer device according to claim 23 which is a refrigeration device.

26. A heat transfer device according to claim 25 which is selected from group consisting of automotive air conditioning systems, residential air conditioning systems, commercial air conditioning systems, residential refrigerator systems, residential freezer systems, commercial refrigerator systems, commercial freezer systems, chiller air conditioning systems, chiller refrigeration systems, and commercial or residential heat pump systems.

27. A heat transfer device according to claim 25 which contains a compressor.

28. A blowing agent comprising a composition as defined in claim 1.

29. A foamable composition comprising one or more components capable of forming foam and a composition as defined in claim 1, wherein the one or more components capable of forming foam are selected from polyurethanes, thermoplastic polymers and resins, such as polystyrene, and epoxy resins, and mixtures thereof.

30. A foam obtained by foaming the foamable composition of claim 29.

31. A foam comprising a composition as defined in claim 1.

32. A sprayable composition comprising material to be sprayed and a propellant comprising a composition as defined in claim 1.

33. A method for cooling an article which comprises condensing a composition defined in claim 1 and thereafter evaporating the composition in the vicinity of the article to be cooled.

34. A method for heating an article which comprises condensing a composition as defined in of claim 1 in the vicinity of the article to be heated and thereafter evaporating the composition.

35. A method for extracting a substance from biomass comprising contacting biomass with a solvent comprising a composition as defined in claim 1, and separating the substance from the solvent.

36. A method of cleaning an article comprising contacting the article with a solvent comprising a composition as defined in claim 1.

37. A method of extracting a material from an aqueous solution comprising contacting the aqueous solution with a solvent comprising a composition as defined in claim 1, and separating the substance from the solvent.

38. A method for extracting a material from a particulate solid matrix comprising contacting the particulate solid matrix with a solvent comprising a composition as defined in claim 1, and separating the material from the solvent.

39. A mechanical power generation device containing a composition as defined in claim 1.

40. A mechanical power generating device according to claim 39 which is adapted to use a Rankine Cycle or modification thereof to generate work from heat.

41. A method of retrofitting a heat transfer device comprising the step of removing an existing heat transfer fluid, and introducing a composition as defined in claim 1.

42. A method of claim 41 wherein the heat transfer device is a refrigeration device.

43. A method according to claim 42 wherein the heat transfer device is an air conditioning system.

44. A method according to claim 4 wherein the existing compound or composition is a heat transfer composition.

45. A method for preparing a composition as defined in claim 1 which composition contains R-134a, the method comprising introducing R-1243ze(E) and R-32, and optionally a lubricant, a stabiliser and/or a flame retardant, into a heat transfer device containing an existing heat transfer fluid which is R-134a.

46. A method according to claim 45 comprising the step of removing at least some of the existing R-134a from the heat transfer device before introducing the R-1243ze(E) and R-32, and optionally the lubricant, the stabiliser and/or the flame retardant.

47. A method for generating greenhouse gas emission credit comprising (i) replacing an existing compound or composition with a composition as defined in any claim 1, wherein the composition has a lower GWP than the existing compound or composition; and (ii) obtaining greenhouse gas emission credit for said replacing step.

48. A method of claim 47 wherein the use of the composition of the invention results in a lower Total Equivalent Warming Impact, and/or a lower Life-Cycle Carbon Production than is be attained by use of the existing compound or composition.

49. A method of claim 47 carried out on a product from the fields of air-conditioning, refrigeration, heat transfer, blowing agents, aerosols or sprayable propellants, gaseous dielectrics, cryosurgery, veterinary procedures, dental procedures, fire extinguishing, flame suppression, solvents, cleaners, air horns, pellet guns, topical anesthetics, and expansion applications.

50. A method according to claim 24 wherein the product is a heat transfer device.

51. A method according to claim 44 wherein the heat transfer composition is a refrigerant selected from R-134a, R-1234yf and R-152a.

* * * * *